(No Model.)

P. BOURGIN.
BEAN THRASHER.

No. 481,841. Patented Aug. 30, 1892.

Witnesses:
J. H. Rouse
J. A. Bayless

Inventor,
Pierre Bourgin
By Dewey & Co.
Att'ys

THE NORRIS PETERS CO., PHOTO-LITHO., WASHINGTON, D. C.

UNITED STATES PATENT OFFICE.

PIERRE BOURGIN, OF OAKLAND, CALIFORNIA.

BEAN-THRASHER.

SPECIFICATION forming part of Letters Patent No. 481,841, dated August 30, 1892.

Application filed April 1, 1892. Serial No. 427,396. (No model.)

*To all whom it may concern:*

Be it known that I, PIERRE BOURGIN, a citizen of the United States, residing at Oakland, Alameda county, State of California, have invented an Improvement in Bean-Thrashers; and I hereby declare the following to be a full, clear, and exact description of the same.

My invention relates to a machine which is especially designed for thrashing beans and similar products, the vines and pods of which are usually spread upon the floor and the seeds beaten out by flails or other means.

It consists in certain details of construction, which will be more fully explained by reference to the accompanying drawings, in which—

Figure 1:
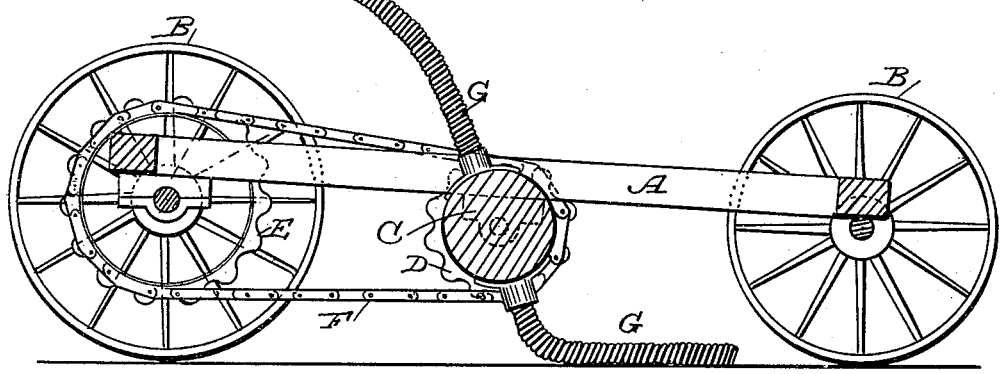
Figure 2:
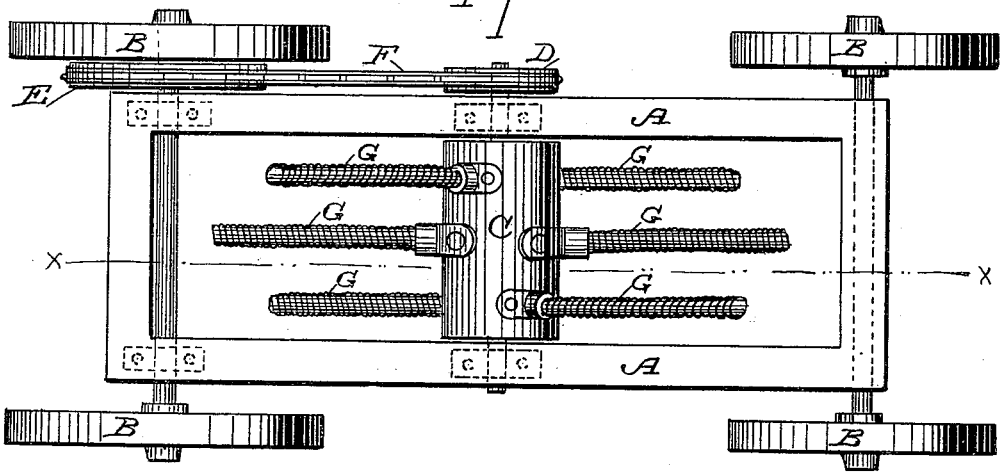

Figure 1 is a vertical section taken through the apparatus on the line $x\ x$ of Fig. 2. Fig. 2 is a plan view.

In the present case I have shown my apparatus mounted upon a framework A, supported upon bearing-wheels B, the axles of which extend across the framework with sufficient space intervening between them to admit my thrashing device. This consists of a drum or roller C, which is journaled across the framework and has upon one end a sprocket-wheel D. A similar sprocket-wheel E is fixed to turn with one of the wheels of the machine, and a chain F, extending between them, communicates motion from the bearing-wheel to the drum. The drum is of any suitable or desired length within the limits of the width of the frame, which may be as great as is found practicable.

Around the periphery of the drum in spiral lines are fixed the elastic flails G. These flails may be made of any suitable or desirable material; but I have found that closely-coiled spiral springs, as shown in the present illustration, are very superior for the purpose. These springs are extremely flexible and are made of a length considerably greater than from the drum to the floor. When the drum is rotating, these springs will be carried over the top and brought down successively upon the material to be thrashed with a force depending upon the speed of rotation of the drum. As the drum continues to rotate, these arms will curl up by reason of their extreme flexibility to allow them to pass beneath the drum and between it and the surface, and as their elasticity tends to straighten them out again after passing behind the drum, they act as lifting-forks to loosen up and turn the vines and material which is beneath them, so that when the machine again passes over it it will present a new surface to the flails.

The machine may be drawn over the floor upon which the vines carrying the bean-pods are spread and caused to traverse it from side to side until the thrashing is completed. These flexible arms constructed in this peculiar manner serve not only as beaters, but as forks or stirrers to lift the vines, as before described, which is a very important feature.

Having thus described my invention, what I claim as new, and desire to secure by Letters Patent, is—

1. A bean-thrashing apparatus consisting of the carriage mounted upon bearing-wheels, a rotary transverse drum journaled upon the carriage, and flexible thrashing-arms projecting radially from the surface of the drum, said arms yielding throughout their length when brought into contact with the material to be thrashed and automatically resuming their normal condition when removed from said contact, substantially as herein described.

2. A bean-thrashing apparatus consisting of a framework mounted upon bearing-wheels, a drum journaled transversely across the framework, a sprocket-wheel upon the outer end of the drum-shaft, a corresponding sprocket-wheel upon one of the bearing-wheels, and and an intermediate driving-chain, thrashing-arms composed of flexible material, adapted to yield to permit them to pass beneath the drum and to automatically straighten out again after being removed from contact with the thrashing-surface, said arms being arranged spirally around the drum in two rows projecting from opposite sides of the drum, substantially as herein described.

3. A bean-thrashing apparatus consisting of the framework mounted upon bearing-wheels, a drum journaled transversely across the framework, driven by power derived from the wheels, two oppositely-projecting series of arms fixed to the surface of the drum, consisting of closely-coiled wire tubes, each row being arranged spirally around the drum, substantially as herein described.

4. A thrashing drum or roller having arms composed of closely-coiled wire tubes adapted to yield upon contact with the thrashing-surface, in combination with means for operating the drum or roller.

In witness whereof I have hereunto set my hand.

PIERRE BOURGIN.

Witnesses:
S. H. NOURSE,
J. A. BAYLESS.